United States Patent [19]

Nakayama et al.

[11] Patent Number: 4,690,106

[45] Date of Patent: Sep. 1, 1987

[54] INTAKE SYSTEM FOR INTERNAL COMBUSTION ENGINE

[75] Inventors: Hideo Nakayama; Shuichi Nakatani; Fusatoshi Tanaka; Hiroyuki Hanafusa, all of Hiroshima, Japan

[73] Assignee: Mazda Motor Corporation, Japan

[21] Appl. No.: 879,639

[22] Filed: Jun. 27, 1986

[30] Foreign Application Priority Data

Jul. 1, 1985 [JP] Japan .................................. 60-142578

[51] Int. Cl.⁴ .............................................. F02B 75/18
[52] U.S. Cl. ............................. 123/52 M; 123/52 MC
[58] Field of Search ........ 123/52 M, 52 ML, 52 MV, 123/52 MB, 52 MC

[56] References Cited

U.S. PATENT DOCUMENTS

| | | | |
|---|---|---|---|
| 3,814,069 | 6/1974 | Croft et al. | 123/52 M |
| 4,590,895 | 5/1986 | Yada et al. | 123/52 MB |
| 4,599,977 | 7/1986 | Materazzi | 123/52 M |

FOREIGN PATENT DOCUMENTS 56-115819  9/1981  Japan .

*Primary Examiner*—Charles J. Myhre
*Assistant Examiner*—David A. Okonsky
*Attorney, Agent, or Firm*—Gerald J. Ferguson, Jr.; Michael P. Hoffman; Ronni S. Malamud

[57] ABSTRACT

An intake system for an internal combustion engine comprises an intake manifold and a surge tank member connected together to form a plurality of long bowed first discrete intake passages each leading to one of the cylinders and a volume chamber disposed on the upstream ends of the first discrete intake passages. The intake manifold is further provided with a plurality of second discrete intake passages each of which branches off from one of the first discrete intake passages to extend on the inner side of the same and is shorter than the first discrete intake passages, and with a communicating passage for interconnecting the second discrete intake passages. A valve is provided in each second discrete intake passage to open and close the second discrete intake passage according to the operating condition of the engine. A part of the wall defining the communicating passage is formed by a plate member sandwiched between the intake manifold and the surge tank member.

11 Claims, 5 Drawing Figures

INTAKE SYSTEM FOR INTERNAL COMBUSTION ENGINE

BACKGROUND OF THE INVENTION

1. Field of the Invention

This invention relates to an intake system for an internal combustion engine, and more particularly to an intake system for an internal combustion engine in which the volumetric efficiency is improved by the ram effect (inertia effect) of intake air.

2. Description of the Prior Art

As is well known, a negative pressure wave generated in an intake system of an internal combustion engine upon the initiation of each intake stroke is propagated upstream of the intake system and is then reflected at an end of the system opening to the atmosphere or to a surge tank disposed on an upstream side of the intake system toward the intake port as a positive pressure wave. By arranging the intake system so that the positive pressure wave reaches the intake port immediately before closure of the intake valve to force intake air into the combustion chamber, the volumetric efficiency can be improved.

However, in order to sufficiently improve the volumetric efficiency, the intake passage must be long when the engine speed is relatively low and must be short when the engine speed is relatively high.

Thus, there has been proposed an intake system in which the length of the intake passage is changed according to the engine speed in order to obtain an inertia effect of intake air over a wider engine speed range. For example, in the intake system disclosed in Japanese Unexamined Patent Publication No. 56(1981)-115819, each of the discrete intake passage portions leading to the respective combustion chambers is bifurcated to form a long passage portion and a short passage portion both opening to a surge tank or the like at the upstream end, and an on-off valve is provided in the short passage portion to open the short passage portion in a high engine speed range to shorten the effective length of the discrete intake passage portion, thereby obtaining a sufficient inertia effect of intake air in the high engine speed range in addition to in a low engine speed range.

In the intake system described above, the volumetric efficiency for one cylinder is improved by the inertia effect of intake air generated by pressure propagation only in the discrete intake passage portion leading to the cylinder. If the pressure propagation in the discrete intake passages leading to other cylinders can be effectively utilized, the volumetric efficiency will be able to be improved by the inertia effect of intake air over a wider engine speed range. This can be realized by providing a communicating passage interconnecting the short passage portions. However, how to provide the communicating passage in the limited space around the engine is a difficult problem. The long passage portions must be long enough to obtain the inertia effect in the low engine speed range and must be smooth in shape so that intake air can smoothly flow therethrough. On the other hand, the short passage portions must be short enough to obtain the inertia effect in the high engine speed range. These requirements further add to the difficulties in providing the communicating passage.

Further, preferably the communicating passage is small in volume in view of pressure transfer between the cylinders. Thus, there is involved another difficulty in providing the communicating passage which is limited in volume and can interconnect the short passage portions, satisfying the requirements described above.

SUMMARY OF THE INVENTION

In view of the foregoing observations and description, the primary object of the present invention is to provide an intake system for an internal combustion engine which is small in size and simple in structure and in which the inertia effect of intake air can be effectively utilized to improve the volumetric efficiency in both the low engine speed range and the high engine speed range, and at the same time, the inertia effect of intake air in each discrete passage portion can be enhanced by the pressure wave in the other discrete intake passage portions so that a sufficient inertia effect of intake air can be enjoyed over a wider engine speed range.

The intake system in accordance with the present invention comprises an intake manifold and a surge tank member connected together to form a plurality of long bowed first discrete intake passages each leading to one of the cylinders and a volume chamber disposed on the upstream ends of the first discrete intake passages. The intake manifold is further provided with a plurality of second discrete intake passages each of which branches off from one of the first discrete intake passages to extend on the inner side of the same and is shorter than the first discrete intake passages, and with a communicating passage for interconnecting the second discrete intake passages. A passage switching means is provided to open and close the second discrete intake passages according to the operating condition of the engine. A part of the wall defining the communicating passage is formed by a plate member sandwiched between the intake manifold and the outer wall of the surge tank member.

With this arrangement, the inertia effect of intake air can be obtained in both the low engine speed range and the high engine speed range and, at the same time, the engine speed range in which the inertia effect can be obtained is widened by virtue of the pressure wave transferred to each cylinder from the other cylinders through the communicating passage.

In addition, since a part of the wall defining the communicating passage is formed by the plate member sandwiched between the intake manifold and the surge tank member, the volume and the shape of the communicating passage can be selected independently from the first discrete intake passages and/or the second discrete intake passages, thereby increasing the degree of freedom in designing the intake system. Further, since the second discrete intake passages are disposed in the space on the inner side of the first discrete intake passages which would be a dead space, the overall size of the intake system is not substantially enlarged.

DESCRIPTION OF THE PREFERRED EMBODIMENT

Figure 1:
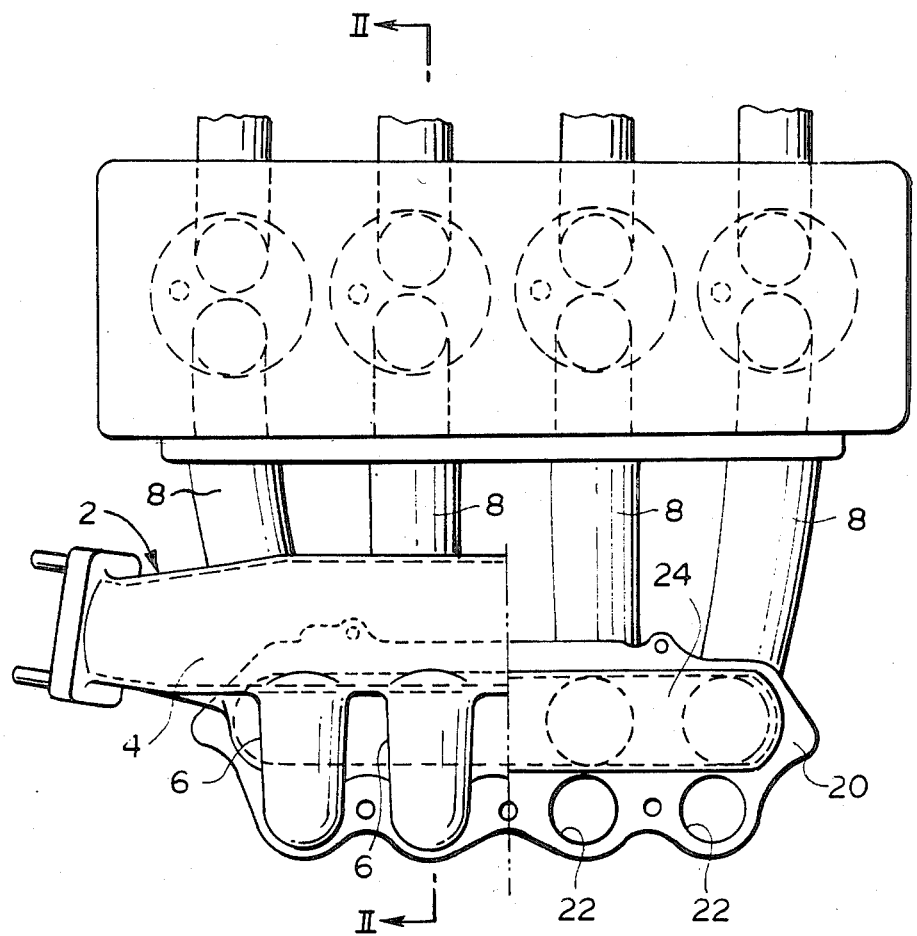
FIG. 1 is a plan view showing a part of an intake system in accordance with an embodiment of the present invention.

In FIGS. 1 to 5, an intake system in accordance with an embodiment of the present invention applied to a four cylinder engine comprises an intake manifold 1 and a surge tank member 2 connected to the engine body 30 having four cylinders 31 by way of the intake manifold 1. The intake manifold 1 and the surge tank member 2 are formed separately from each other and connected with each other.

The engine body 30 has four intake ports 31 opening on one side thereof and the intake manifold 1 and the surge tank member 2 are disposed on the side of the engine body 30. The intake system further comprises, though not shown, a throttle body having a built-in throttle valve disposed upstream of the surge tank member 2 and an air cleaner disposed upstream of the throttle body.

There are formed in the surge tank member 2 a volume chamber 4 and four passage portions 6 opening into the volume chamber 4. The intake manifold 1 has four branch pipes 8 and the intake manifold 1 and the surge tank member 2 are connected together with the upstream end of each branch pipe 8 butting against the downstream end of one of the passage portions 6 to form a first discrete intake passage 10 connecting the volume chamber 4 and one cylinder 31. Thus, four first discrete intake passages 10 each leading to one of the cylinders 31 are formed. Each first discrete intake passage 10 first extends away from the engine body at the upstream portion thereof and turns toward the engine body to extend below the volume chamber 4 at the downstream portion thereof so that the effective length of each first discrete intake passage 10 is elongated to be enough to obtain a sufficient inertia effect of intake air in the low engine speed range.

In the intake manifold 1 are formed four second discrete intake passages 12 each branching off from one of the branch pipes 8 on the inner side of the first discrete intake passage 10. The intake manifold 1 is integrally provided with a communicating passage portion 14 for interconnecting the second discrete intake passages 12. That is, the second discrete intake passages 12 and the communicating passage portion 14 are provided in a space defined by the first discrete intake passages 10 and the volume chamber 4 which would be a dead space if it were not for the second discrete intake passages 12 and the communicating passage portion 14.

A shutter valve 16 is provided in each second discrete intake passage 12. The shutter valve 16 is closed in the low engine speed range and opened in the high engine speed range.

Figure 3:
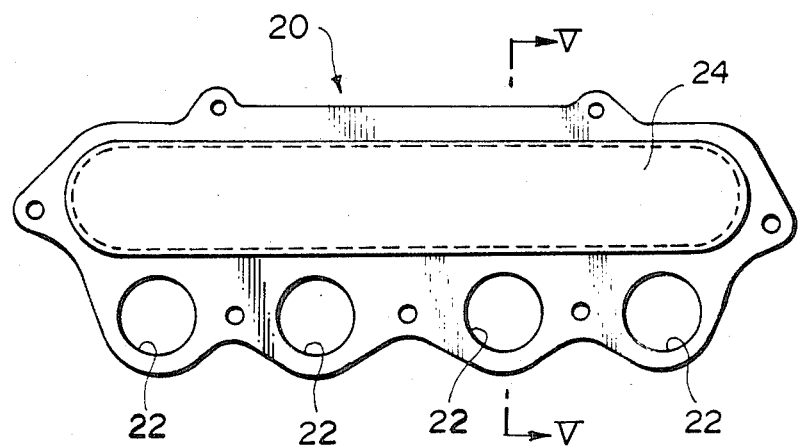
FIG. 3 is a plan view of the plate member employed in the intake system.
Figure 4:
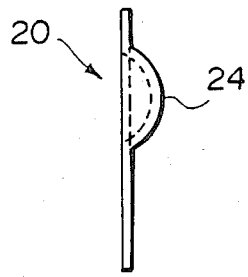
FIG. 4 is a side view of the plate member.
Figure 5:
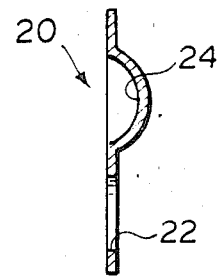
FIG. 5 is a cross-sectional view taken along line V—V in FIG. 3.

The upper wall portion of the communicating passage portion 14 is formed by a plate 20 sandwiched between the intake manifold 1 and the surge tank member 2. The plate 20 is of metal and has an area such as to cover the entire area of the mating faces of the intake manifold 1 and the surge tank member 2. The plate 20 also functions as a gasket for sealing the mating faces of the intake manifold 1 and the surge tank member 2. As shown in FIGS. 3 to 5, the plate 20 has four openings 22 corresponding to the first discrete intake passages 10, and is provided with an outwardly convex wall portion 24 extending in the direction of the row of cylinders 31 at a portion opposed to the communicating passage 14. The wall portion 24 is formed by draw forming and affords the communicating passage 14 a volume optimal for the pressure transfer between the cylinders 31. The wall portion 24 further serves to increase the rigidity of the communicating passage 14 and to improve flow of intake air through the communicating passage.

When the engine speed is low, the shutter valves 16 are closed and accordingly intake air is introduced from the volume chamber 4 into the cylinders 31 through the first discrete intake passages 10. In this case, the negative pressure wave is reflected at the volume chamber 4. On the other hand, when the engine speed is high, the shutter valves 16 are opened and accordingly, the negative pressure is reflected at the communicating passage portion 14. Thus, the effective length of the intake passage is changed according to the engine speed so that an optimal inertia effect can be obtained. Further, in the high engine speed range, pressure waves from the other cylinders 31 act on each cylinder 31, and accordingly the intake inertia effect can be further enhanced and can be obtained over a wider engine speed range. Accordingly by opening the shutter valves 16 when the engine speed is not lower than the intermediate speed between the low engine speed range and the high engine speed range and otherwise closing them, the volumetric efficiency can be improved substantially over the entire engine speed range.

Figure 2:
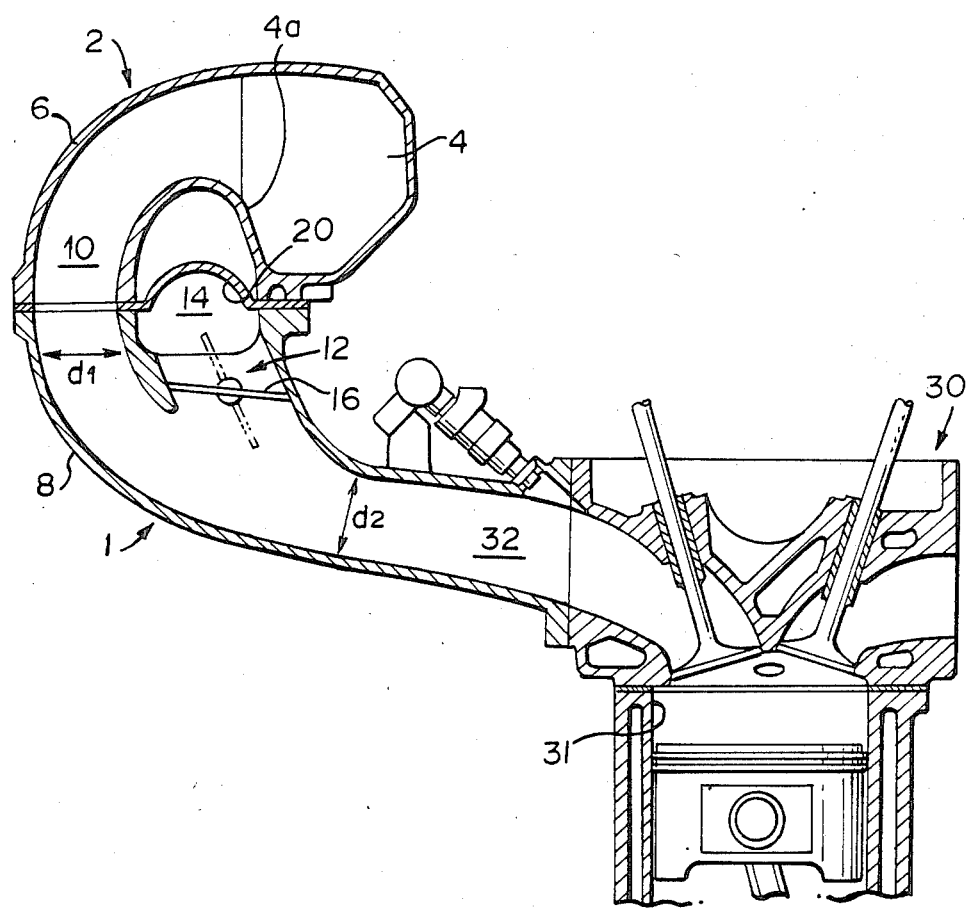
FIG. 2 is a cross-sectional view taken along line II—II in FIG. 1.

As clearly shown in FIG. 2, the lower surface of the surge tank member 2 above the communicating passage portion 14 is upwardly convex. This facilitates the drawing downward of the core during casting of the surge tank member 2 and serves to improve the flow of intake air. That is, the wall portion 4a of the volume chamber 4 is inclined or bowed to smoothly merge into the first discrete intake passages 10, whereby intake resistance is reduced and the engine output power is improved.

It has been experimentally found that the volume of the volume chamber is preferably not smaller than half of the displacement of the engine and the volume of the communicating passage portion 14 is preferably not larger than 1.5 times the displacement of the engine. Further, preferably the volume of the communicating passage portion 14 is smaller than that of the volume chamber 4, and the cross-sectional area of the communicating section 14 is larger than that of the first discrete intake passages 10. Further, in this particular embodiment, the diameter d1 of the first discrete intake passages 10 is substantially equal to the diameter d2 of the intake ports 32.

The volume or the cross-sectional area of the communicating passage portion 14 can be easily controlled by changing the shape of the plate 20 or more particularly by changing the cross section of the wall portion 24. This means that the communicating passage portion 14 can be independent of the length of the first discrete intake passages 10. That is, if the upper wall portion of the communicating passage portion is defined by the outer wall portion of the surge tank member 2, said shape and volume requirements for the communicating passage portion 14 cannot be satisfied without sacrificing the length or the shape of the first discrete intake passages 10. In accordance with the present invention, the shape and the volume of the communicating passage portion 14 can be selected with a high degree of freedom by changing the shape of the plate 20 independently from the first discrete intake passages 10. In other words, the first discrete intake passages 10 and the volume chamber can be designed freely independently from the communicating passage portion 14.

We claim:

1. An intake system for an internal combustion engine having a plurality of cylinders comprising an intake manifold and a surge tank member connected together to form a plurality of first discrete intake passages each of which leads to one of the cylinders and is bowed substantially in a vertical plane and a volume chamber disposed on upstream ends of the first discrete intake passages characterized in that the intake manifold is provided with a plurality of second discrete intake passages each of which branches off from one of the first discrete intake passages to extend from an the inner side of the same and is shorter than the first discrete intake passages, and with a communicating passage for interconnecting the second discrete intake passages, a passage switching means being provided to open and close the second discrete intake passages according to an operating condition of the engine and a part of a wall defining the communicating passage being formed by a plate member sandwiched between the intake manifold and an outer wall of the surge tank member.

2. An intake system as defined in claim 1 in which said plate member forms an upper wall portion of the communicating passage.

3. An intake system as defined in claim 2 in which said plate member has an area such as to cover the entire area of the mating faces of the intake manifold and the surge tank member and also functions as a sealing member for sealing the mating faces of the intake manifold and the surge tank member.

4. An intake system as defined in claim 3 in which said intake manifold is connected to a bottom face of the volume chamber by way of the plate member at an upper portion of the second discrete intake passages.

5. An intake system as defined in claim 2 in which the part of the plate member forming the upper wall portion of the communicating passage is upwardly convex and is formed by draw forming.

6. An intake system as defined in claim 2 in which the mating faces of the intake manifold and the surge tank member are in a horizontal plane substantially at the same height as the bottom face of the volume chamber.

7. An intake system as defined in claim 1 in which each of said first discrete intake passages first extends away from the engine body at the upstream portion thereof and turns toward the engine body to extend below the volume chamber at the downstream portion.

8. An intake system as defined in claim 7 in which said volume chamber and the upper portion of said first intake passages are integrally formed in the surge tank member, the volume chamber being formed to extend in the direction of the row of the cylinders.

9. An intake system as defined in claim 7 in which the upstream ends of the first discrete intake passages are connected to the upper portion of one side of the volume chamber.

10. An intake system as defined in claim 1 in which the volume of the volume chamber is not smaller than half of the displacement of the engine and the volume of the communicating passage is not larger than 1.5 times the displacement of the engine.

11. An intake system as defined in claim 10 in which the volume of the communicating passage is smaller than that of the volume chamber and the cross-sectional area of the communicating passage is larger than that of each first discrete intake passage.

* * * * *